US008285651B1

(12) United States Patent
Leon et al.

(10) Patent No.: US 8,285,651 B1
(45) Date of Patent: Oct. 9, 2012

(54) HIGH SPEED PRINTING

(75) Inventors: J P Leon, Tucson, AZ (US); Keith Bussell, Los Angeles, CA (US)

(73) Assignee: Stamps.com Inc., El Segundo, CA (US)

( * ) Notice: Subject to any disclaimer, the term of this patent is extended or adjusted under 35 U.S.C. 154(b) by 1332 days.

(21) Appl. No.: 11/323,462

(22) Filed: Dec. 30, 2005

(51) Int. Cl.
*G06F 17/00* (2006.01)
*G07B 17/02* (2006.01)
*G06Q 30/00* (2006.01)

(52) U.S. Cl. ........................................ 705/401; 705/330

(58) Field of Classification Search .................. 705/401, 705/330
See application file for complete search history.

(56) References Cited

U.S. PATENT DOCUMENTS 5,094,554 A 3/1992 Hurd et al.
5,297,783 A * 3/1994 Howard et al. ............ 270/52.12
5,606,507 A 2/1997 Kara
5,745,887 A 4/1998 Gargiulo et al.
5,812,991 A * 9/1998 Kara ............................ 705/410
6,005,945 A 12/1999 Whitehouse
6,079,327 A 6/2000 Sarada
6,175,826 B1 1/2001 Malandra, Jr. et al.
6,202,057 B1 * 3/2001 Pierce ........................... 705/408
6,208,980 B1 3/2001 Kara
6,502,912 B1 1/2003 Bernard et al.
6,889,214 B1 5/2005 Pagel et al.
6,938,016 B1 * 8/2005 Ryan, Jr. ......................... 705/60
7,243,842 B1 7/2007 Leon et al.
2001/0024228 A1 9/2001 Klinefelter et al.
2002/0040333 A1 4/2002 Fuwa
2002/0040353 A1 4/2002 Brown et al.
2002/0073052 A1 * 6/2002 Katikaneni et al. ........... 705/408
2002/0127040 A1 9/2002 Davies et al.
2003/0004900 A1 1/2003 Schwartz et al.
2003/0074324 A1 4/2003 Kresina et al.
2004/0001133 A1 1/2004 Critelli et al.
2004/0215583 A1 10/2004 Elliott
2005/0076047 A1 * 4/2005 Starrett ......................... 707/101
2005/0256811 A1 11/2005 Pagel et al.
2006/0036557 A1 2/2006 Mattern
2006/0116971 A1 6/2006 Beckstrom et al.
2007/0073587 A1 3/2007 Walker et al.
2010/0312627 A1 12/2010 Khechef et al.

OTHER PUBLICATIONS

Business Wire. "E-Stamp Receives National Approval from U.S. Postal Service; Small and Home Offices Can Now Buy and Print Internet Postage from their PCs" p. 1040. Aug. 9, 1999.*
Pintsov, Leon et al., "Postal Revenue Collection in the Digital Age", Springer Berlin/Heidelberg, Financial Cryptography, Jan. 1, 2001, 19 pgs.
Postnet Barcode Certification User Guide, United States Postal Service, Aug. 1997, 8 pages.
Postage Payment Methods: Stamps, 604, Domestic Mail Manual, Jan. 8, 2006, 46 pages.

* cited by examiner

*Primary Examiner* — John Hayes
*Assistant Examiner* — Allen J Jung
(74) *Attorney, Agent, or Firm* — Fulbright & Jaworski L.L.P.

(57) ABSTRACT

A system and method for high-speed processing of mail pieces is disclosed. The high-speed system includes client server that forms and prints a reduced Information-Based Indicia (RIBI) on each piece of mail. The client server provides funds to the system server and reports the RIBI usage to the system server. The system server issues tokens to the client server that allow the client server to the print RIBI indicia for a certain value of postage.

21 Claims, 3 Drawing Sheets

HIGH SPEED PRINTING

CROSS-REFERENCE TO RELATED APPLICATIONS

This application is related to co-pending and commonly assigned U.S. patent application Ser. No. 10/677,619 entitled "SYSTEM AND METHOD FOR HIGH-SPEED POSTAGE APPLICATION MANAGEMENT," Ser. No. 11/323,463 entitled "SYSTEMS AND METHODS FOR SINGLE PASS PRINTING POSTAGE INDICIA," Ser. No. 10/994,768 entitled "COMPUTER-BASED VALUE-BEARING ITEM CUSTOMIZATION SECURITY," filed Nov. 22, 2004; Ser. No. 10/994,914 entitled "CUSTOMIZED COMPUTER-BASED VALUE-BEARING ITEM QUALITY ASSURANCE," filed Nov. 22, 2004; Ser. No. 10/994,728 entitled, "PRINTING OF COMPUTER-BASED VALUE-BEARING ITEMS," filed Nov. 22, 2004; Ser. No. 10/994,698 entitled "IMAGE-CUSTOMIZATION OF COMPUTER-BASED VALUE-BEARING ITEMS," filed Nov. 22, 2004; and Ser. No. 11/114,964 entitled "QUALITY ASSURANCE OF IMAGE CUSTOMIZATION OF COMPUTER-BASED VALUE-BEARING ITEMS," filed Apr. 25, 2005, the disclosures of which are hereby incorporated herein by reference.

TECHNICAL FIELD

The present invention is generally related to high-speed mail processing systems and, more particularly, to a high-speed mail handling system that applies postage or Information-Based Indicia (IBI) to each mail piece on a piece-by-piece basis.

BACKGROUND OF THE INVENTION

Approximately eighty percent of the current stream of letter mail is produced in the high-speed postage environment. Postage is produced at about 70,000 pieces per hour by high-speed postage machines. Typically, items such as utility bills, direct mail pieces and catalogs are processed in this manner. These items are produced on machines that are generically called inserters. Mail pieces move along a conveyor belt through the various components of the machine. Postage is applied on the mail pieces in various ways, such as permit mail or metered mail.

In the case of metered mail, at the end of the high-speed conveyor belt, there is a traditional electro-mechanical meter that applies postage to the items. A plate representing the postage value is pressed down on each mail piece to mark the postage. The postage is printed with a phosphorescent ink. The development of meter machines has not kept up with improvements in the rest of the high speed postage equipment. As a result, the meters are actually slower than the rest of the machine. In other words, the other elements the high-speed process, such as inserters, folders and stuffers, move mail faster than the traditional meter can print the required postage.

One example of a high-speed system is a manifest system. The manifest system is an enhancement to the United States Postal Service's (USPS) permit system, which allows non-unique conditions to be applied to each envelope that indicated the postage that should be paid for the envelope. The permit system simply identifies the permit holder's number and where it is being mailed from and the class of mail to be used. In the permit system, all pieces needed to be of identical weight and of an identical mail class. The pieces where then weighed to determine the total postage due. The manifesting system allows pieces of various weights and mail classes to be mixed into a single batch by applying a unique number to each mail piece. That unique number is keyed to a character code that describes the rate category, the weight of the mail piece and the postage amount for that individual piece.

The mail pieces are presented along with a document that describes each piece within the mailing, including each piece's unique number and weight, and the postage amount for each piece. This information can then be checked in a statistical fashion in order to insure that those mail pieces are actually in the permit system. This system requires inspection upon presentment of the mail to the USPS in order to assure compliance, and requires more steps and more bookkeeping than systems that use live postage.

As is well-known, postage is based on the weight of the mail items. Some types of mail, such as bills, will include a different number of pages in each piece. For example, customers who have charged a lot of purchases may have more pages in their credit card bills than customers who have made a single purchase. Additionally, some advertising inserts may be included in some customers bills, but not others. Therefore, each mail piece will have a different weight. This causes a problem with traditional meters because, in the high-speed postage environment, the meters typically need to be set up for a single postage value because the postage value cannot be changed quickly. Every piece that goes through the line needs to have the same postage value applied in the traditional high-speed mailing environment.

Other arrangements have been attempted to solve these problems, such as physically splitting the processing line to send mail pieces to multiple postage meters, wherein each meter is set at a different postage value. While this arrangement allows different postage values to be applied to different mail pieces of varying weight, this is an expensive solution that requires additional equipment, such as multiple postage meters and a mechanism to sort pieces by weight. Additionally, in this solution, the postage value options are limited by the number of meters that are installed.

Another problem with these types of systems is security. In the current environment of the USPS, there is an initiative to remove all of these traditional type printers or meters that are being used because the USPS view them as security issues. These systems have very little protection of the funds that are inside the meter itself. There are easy ways to manipulate the registers that keep the funds inside those meters. Moreover, there is a great difficulty in accounting for each piece of mail, such that the USPS cannot be sure that each piece of mail has had is postage properly paid for. Thus, running through millions of pieces of mail through these traditional meters, the USPS is viewing the usage of the meters as a huge loss of postage revenue due to the USPS.

Pitney Bowes has a version of a high speed postage meter that is fast enough to work in a high volume environment. These meters produces an indicia that is known as a digital indicia, or bar code, which encodes variable information into each postage indicia. The variable information may comprise information as to where indicia came from, how much postage has been paid for, the serial number of that meter and so forth. Thus, this provides more security, because the additional information allows the USPS (or other entity) to be able to trace mailing back to ensure that the postage has been properly paid for that piece of mail. One drawback with these systems is that they are expensive. Using one of theses systems increases the cost of mailing each envelope from fractions of a cent to one or more cents.

BRIEF SUMMARY OF THE INVENTION

The present invention is directed to a system and method that uses a reduced Information-Based Indicium (RIM) that is printed by a high-speed printer that operates faster than traditional postage meters. Note that as used herein indicium is singular and indicia is plural.

Embodiments of the invention comprises a client server and a system server. The client server that forms and prints a RIBI indicium on each piece of mail. The client server provides funds to the system server and reports the RIBI usage to the system server. The reported information includes information that would allow the formation of a full IBI indicium. The system server issues tokens to the client server based on the received funds. The tokens allow the client server to the print RIBI indicia for a certain value of postage. Printing a RIBI is faster than printing an IBI. The MI can only be printed with a system that includes a trusted e-meter, while the RIBI may be printed on a system that does not include a trusted e-meter.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which.

DETAILED DESCRIPTION OF THE INVENTION

Figure 5:
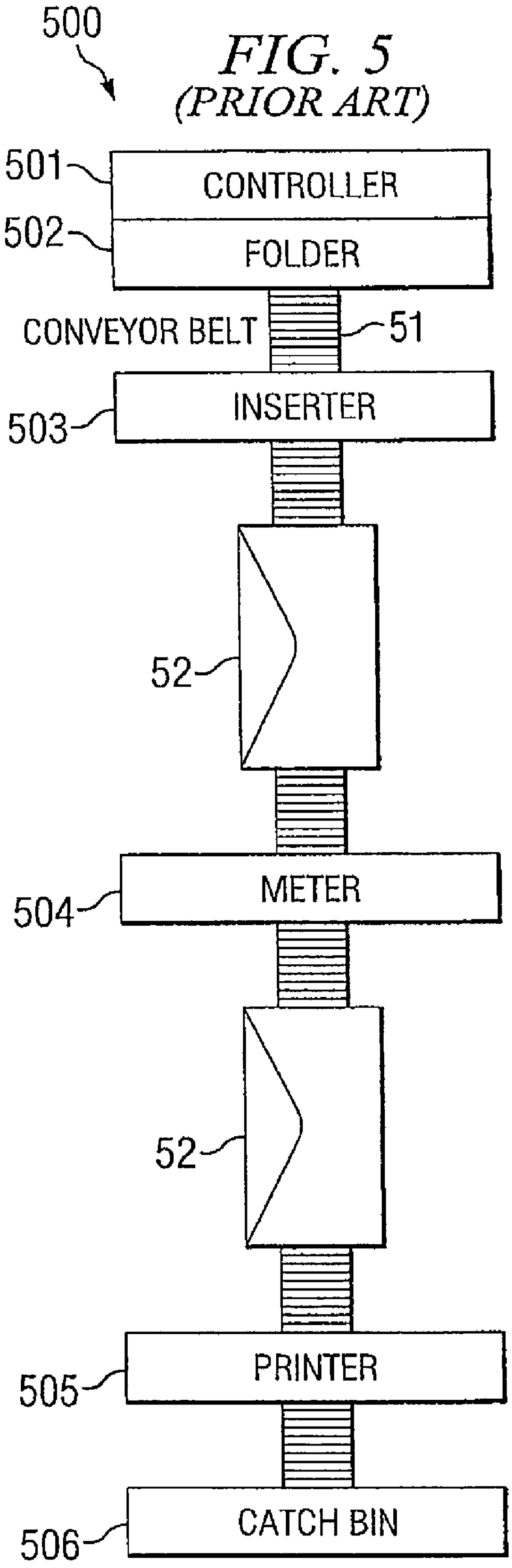
FIG. 5 (PRIOR ART)
FIG. 5 is a block diagram of a prior art high-speed mail processing system.

FIG. 5 illustrates an existing system 500 for processing mail pieces. Controller 501 communicates with folder 502, inserter 503, meter 504, and printer 505 and controls the entire process. The component parts of each mail piece travel through folder 502 where they are assembled and folded. The folded pieces then travel along conveyor belt 51 to inserter 503 where the folded pieces are inserted into an envelope. Stuffed envelope 52 is then moved by conveyor belt 51 past meter 504, which applies postage of a pre-designated value to envelope 52. Marked envelope 52 then travels along conveyor 51 to printer 505 where the addressing information is printed. Envelope 52 continues down conveyor 51 to catch bin 506 where it is stored in sorted order.

It will be understood by those of skill in the art that any of devices 502, 503, or 505 can be eliminated from system 500, if necessary. Meter 504 is a mechanical imprint stamp and, therefore, must print all the postage the same way. Accordingly, in the existing systems, every letter 52 must have the same weight and must be of the same class. If the weight or class vary, the machine must be stopped and meter 504 has to be reset for a new class or weight. In situations where multiple postages are required, conveyor belt 51 could be split (not shown) into two or more paths after inserter 503 and prior to meter 504. Each of the paths would have a separate meter 504, each meter having postage for a unique class and weight. In this matter multiple postage amounts may be applied using the existing high-speed production line. However, this requires additional equipment and, therefore, additional expense. Also, the number of available postage options is limited by the number of meters 504 that are added to the line.

Figure 1:
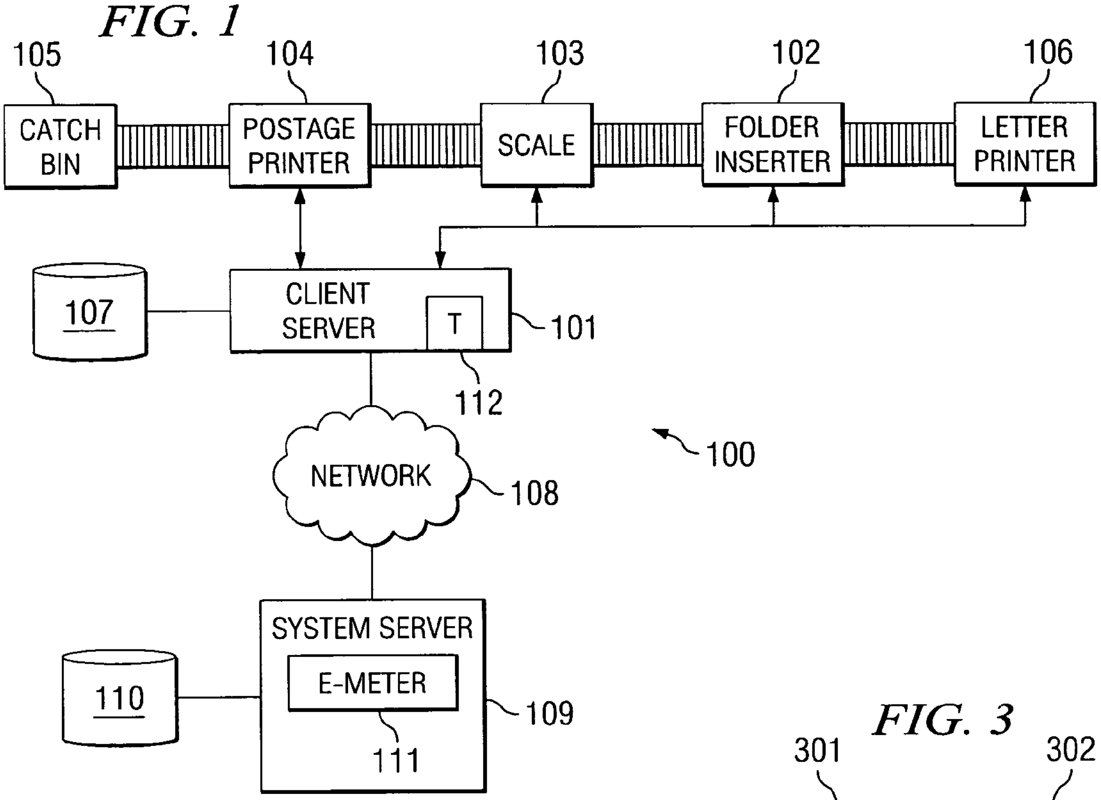
FIG. 1 is a block diagram of a high-speed mail processing system incorporating embodiments of the present invention.

FIG. 1 illustrates high-speed mailing system 100 embodying aspects of the present invention. System 100 includes some of the same components as used in the prior art system illustrated in FIG. 5. Client server 101 communicates with system server 109 via a network 108, e.g. an intranet or Internet. The postage value and/or the applied postage indicium may be different for each mail piece. In system 100, there is no requirement that all of the mail pieces flowing through the system have the same postage value and/or be of the same class. Therefore, it is possible to intersperse different types of mail pieces and even to simultaneously process mail pieces from different companies. Each of the mail pieces is tracked by at least one of server 101 and server 109 so that system 100 tracks the proper postage for each mail piece as it is processed through the system. Note that the embodiments are described in terms of envelopes or mail pieces, however, envelopes or mail pieces may include postcards, boxes, packages, tubes, or any other item that may be sent through the mail. Further note that system server 109 may be connected to one or more client servers 101.

Letter processing involves an optional letter printer 106 which prints the enclosures to be mailed. One or more preprinted letters may be supplied to the system in lieu of the printer 106, e.g. a stack of letters. A folder/inserter 102 optionally folds the enclosures that are to be mailed and then inserts them into an envelope. The letters may be proportionally sized to the envelope such that folding is not necessary. An optional scale 103 may be used to weigh each envelope for postage calculation purposes. Note that postage may be calculated by estimating the weight of the envelope, especially when the number and weight of the enclosures and the weight of the envelope is known. Printer 104 prints a postage indicium onto the envelope. Catch bin 105 receives the envelope with the printed postage. Note that postage indicium may be applied in any orientation and at any location on the envelope. Alternatively, printer 104 may print the postage indicium onto a label which is then attached to envelope. Printer 104, another printer (not shown), or a label maker (not shown) may print either or both of a source address and a destination address to the envelope or may attach a label with the either or both of the address(es) to the envelope, as well as other envelope features such as a printed border, e.g. the standard red and blue airmail border or other design, tracking information, and/or orientation information (e.g. a facing indication mark). Database 107 contains information regarding the mail pieces to be processed by system 100. This information includes items such as the source address, destination address, mail class, folding method, weights of the inserted pages, and the other information to be used for each production job. The system may operate continuously to process mail.

The printed postage amount may be computed by client server 101, system server 109, or other postage computing device (not shown), which uses information about the individual mail piece. System 100 is able to determine the postage due on a piece-by-piece basis. Printer 104 can print postage indicia for any postal class and for any weight. Accordingly, in system 100, the mail pieces can vary by class and weight and a single production line can be used to process these mail pieces.

In an embodiment, server 101 is a single device that controls the operation of the client server side of the system 100, however, other embodiments may have the different functions separated into one or more other components. For example, the postage computing may be performed by a separate processor. Server 101 may direct the letter printer to generate one or more letters to be mailed. Server 101 may then direct folder-inserter 102 to combine and/or fold the one or more pages of the letter, and then insert them into an envelope. Using an actual weight of the stuffed envelope from optional scale 103 or an estimated weight of the stuffed envelope from information stored in database 107, the server may calculate the amount of postage that is required to mail the envelope. The calculations may be based upon different criteria, such as the weight of envelope, the class of the envelope, and a destination of the envelope.

The e-meter 111 is the trusted structure that generates the data for a full IBI indicium. Note that there may be more than one e-meter. One or more e-meters may be dedicated to each client server. Alternatively, the one or more e-meters may be shared by the different client servers, wherein each client server has an associated data record that is loaded into the e-meter(s) when the client server interacts with the system server. For further information see U.S. Pat. No. 6,889,214, Pagel et al., issued May 3, 2005, and U.S. patent application Ser. No. 10/862,058, entitled ‘VIRTUAL SECURITY DEVICE,” filed Jun. 4, 2004, and published as US 2005/0256811 on Nov. 17, 2005. As shown in FIG. 1, the e-meter may reside in the system server 109. However, the e-meter may also reside in the client server 101. The e-meter may be a software, hardware, or combination structure.

In an embodiment, postage application printer 104 is a high-speed ink jet printer that prints an Information-Based Indicia (IBI) on the envelopes or mail pieces. The IBI is a fully (or at least partially) computer-readable mark, e.g. a bar code, which comprises encrypted information which provides security to the postage system by reducing the risks of forgery, meter tampering, and unauthorized use. Each IBI is unique and may include information such as one or more of a date, a time, a printer registration number, a user number, a source address, a destination address, mailing information (e.g. postage value, class, weight, size of the envelope, and/or number of pages, etc.), an IBI serial number, a digital signature, zip code, tracking information, and special services information (e.g. insurance, return receipt, certified mail, registered, express mail, or other services).

Thus, each envelope would be marked with a unique IBI. The data for the IBI may be formed by either server 101, server 109, or by a combination of both servers. Note that if the data is formed by server 109 or a combination of servers 101 and 109, then the data for the IBI is provided to server 101. The IBI may include human readable information such as a postage amount, a USPS postal mark, and/or a client selected indicia. Note that the IBI data may be collected or inputted into the system server 109 and stored on the database 110.

The information encoded into information based postage indicia has typically included sufficient information to authenticate an indicium from information on the face on the postal item. For example, the machine readable portion of an information based postage indicium may include an indicia version number, an algorithm identification, a software identification, a label sheet identification, a label identification, a vendor identification, a meter number, a postal security device model number, a postal security device serial number, a transaction number, an ascending register value, a descending register value, the postage value, addressor information, addressee information, originating zip code, a date of creation of the postage indicia, a mail category, a digital signature, an authentication certificate number, and/or an authentication certificate, perhaps signed using public key/private key cryptography. Accordingly, information based postage indicia may often comprise 64-96 bytes of encoded information. A current configuration of information based indicia acceptable to the United States Postal Service comprises the following information encoded in the machine readable portion thereof.

| Field Order in Indicia | IBI DD Field Reference Number | Field Length | Indicia Offset | Data Elements |
|---|---|---|---|---|
| 1 | 11 | 1 | 0 | Indicia Version Number |
| 2 | 1 | 1 | 1 | Algorithm ID |
| 3 | 3 | 4 | 2 | Certificate Serial Number |
| 4 | 10 | 2 | 6 | IBI Vendor ID |
| 5 | 16 | 2 | 8 | PSD Model Number |
| 6 | 17 | 4 | 10 | PSD Serial Number |
| 7 | 2 | 5 | 14 | Ascending Register |
| 8 | 15 | 3 | 19 | Postage Value |
| 9 | 5 | 4 | 22 | Date of Creation |
| 10 | 14 | 4 | 26 | Originating Zip Code |
| 11 | 18 | 2 | 30 | Software ID2 |
| 12 | 27 | 7 | 32 | LabelSheetID |
| 13 | 28 | 2 | 39 | LabelID |
| 14 | 7 | 4 | 41 | Descending Register |
| 15 | 12 | 4 | 45 | Mail category |
| 16 | 9 | 40 | 49 | Digital Signature |

Use of a two-dimensional barcode, such as PDF 417, DataMatrix, or MaxiCode, to encode such information in an information based postage indicia results in a relatively large postage indicium.

An IBI that includes all or much of the information outlined above may require a large-sized indicia, that in turn, may require a significant amount of time to print onto the envelope, such that the system 100 may operate at a slow or less-than optimum speed. Thus, an IBI Light indicia may be used. Going forward, this type of indicia will be referred to as a Reduced IBI or RIBI in this application. RIBI may have a size of 32 bytes or less of data, while IBI typically has 64 bytes or more of data. The reduced size allows a standard ink-jet printer to print the indicia in a single pass, thus increasing the speed of the system, while reducing the cost of the system by allowing standard printers to be used (or at least standard printer components to be used). The data for the RIBI may be formed by either server 101, server 109, or by a combination of both servers. Note that if the data is formed by server 109 or a combination of servers 101 and 109, then the data for the RIBI is provided to server 101. Note that if the RIBI formation involves the server 101, then the server 101 and/or the software associated with RIBI formation will have security features to prevent tampering with RIBI formation.

To maintain postal security, the RIBI should include enough data to allow for association of the RIBI with the full data typically needed to form a IBI indicium. In a first embodiment, the RIBI indicium may comprise a portion of the IBI indicium. The IBI indicium is formed using the standard information, then the RIBI indicium is formed from a portion of the IBI indicium. For example, the first 21 bytes of the IBI indicium is used as the RIBI indicium, and the remaining bytes of the IBI are not used in the RIBI. In a second embodiment, the RIBI indicium is formed using a portion of the data used in forming the IBI indicium. For example, suppose the IBI indicium is to be formed by from the following information: a date, a time, a printer registration number, a user number, a source address, and a destination address. The RIBI indicium may be formed by using only a date, a time, and a printer registration number. In a third embodiment, the RIBI indicium may comprise a pointer that points to a database address for the IBI information.

In any event, database 107 would include entries for the RIBI and the corresponding IBI information and/or data for each of the RIBIs that have been applied to envelopes. This information may be shared with database 110 of the system server 109. The USPS may be supplied or access information from server 109 (including database 110) and/or server 101 (including database 107). Note that the second and third embodiments do not require the formation of IBI indicia. For these embodiments, the IBI information that is used to form the indicia may be stored without storing the IBI indicia. Thus, for these two embodiments, the client server need not form IBI indicium, nor does the client server need to have the ability to form the IBI indicium.

Light information based postage indicium is referred to as “light” or “reduced” herein due to the information based postage indicia encoding a reduced set of data in the indicia. The RIBI data may be collected or inputted into client server 101 and stored on database 107. Although light information based postage indicium of embodiments of the invention provides for encoding postage data therein, such as indicia version number, meter number, vendor identification, vendor model number, postal security device model number, transaction number, piece counter, ascending register value, descending register value, postage value, addressor information, addressee information, posting zip code, mail service information, authentication certificate number, and/or authentication certificate, light information based postage indicium encodes less postage data than is encoded in information based postage indicium. For example, embodiments of light information based postage indicium encode approximately 20 bytes of information within machine readable portion rather than the 64-96 bytes of information encoded within the machine readable portions of information based postage indicia. A configuration of light information based indicia acceptable to the United States Postal Service comprises the following information encoded in the machine readable portion thereof.

| | IBI DD Field Reference Number | Field Length | Indicia Offset | Data Elements |
|---|---|---|---|---|
| 1 | 11 | 1 | 0 | Indicia Version Number |
| 2 | 30 | 4 | 1 | Piece Counter |
| 3 | 35 | 1 | 5 | IBI Vendor/Model |
| 4 | 36 | 3 | 6 | PSD Serial Number3 |
| 5 | 15 | 3 | 9 | Postage Value |
| 6 | 37 | 2 | 12 | Intelligent Mail Service |
| 7 | | 6 | 14 | Blank |

Figure 3:
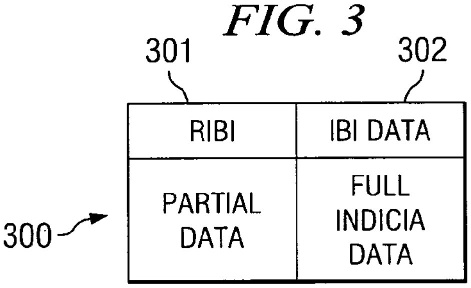
FIG. 3 is an example of a database entry for a Reduced IBI and the associated data of an IBI.

FIG. 3 depicts an example of a data entry 300 in a database, e.g. database 107 and/or database 110. The data entry includes RIBI data 301 and the associated IBI data 302.

Figure 2:
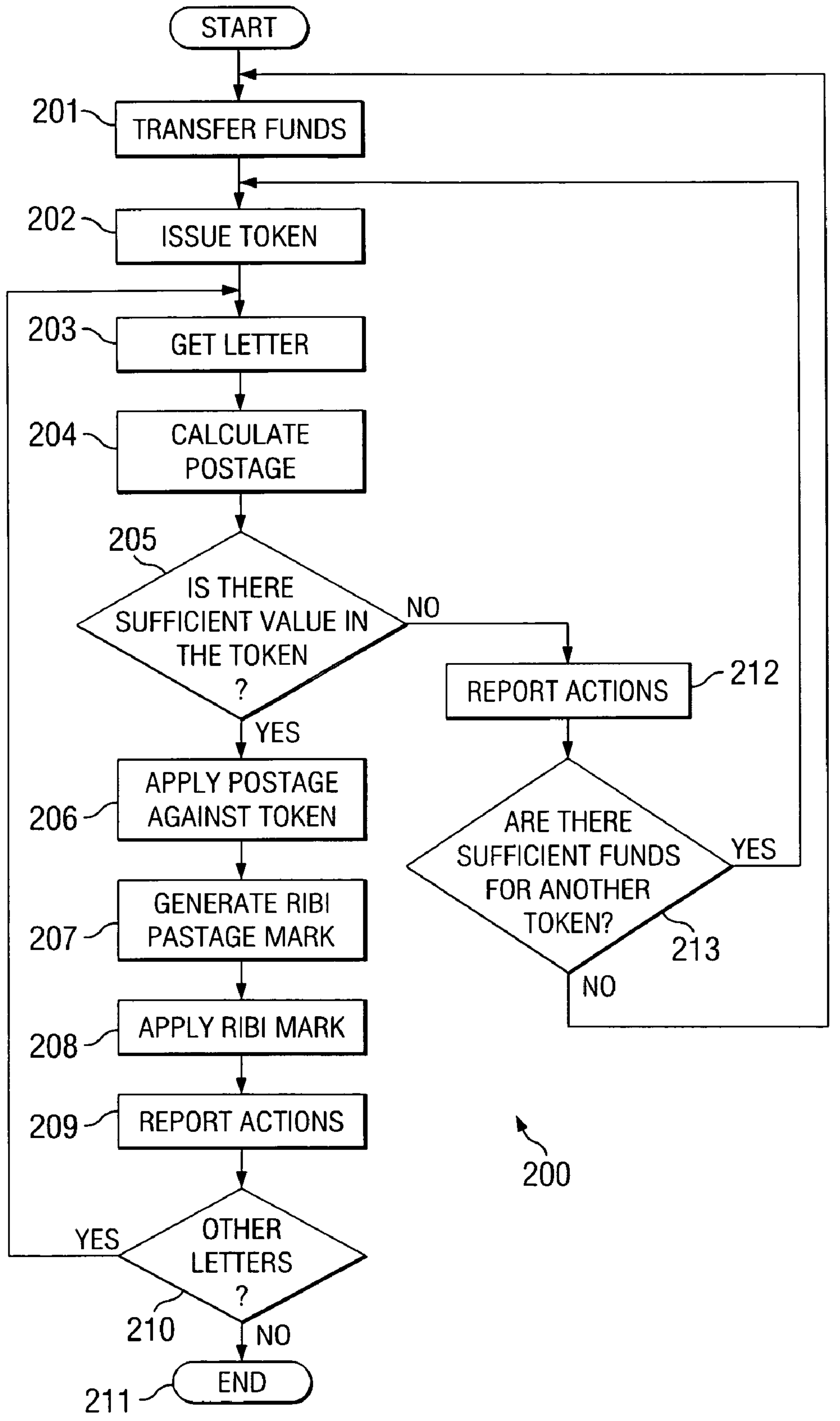
FIG. 2 is a flow chart illustrating a process incorporating embodiments of the present invention.

FIG. 2 shows an example of process 200 that marks envelopes with an RIBI indicium using the system 100 of FIG. 1. Note that system 100 may use other processes and process 200 may be used on other systems. The process 200 starts by transferring funds 201 from the client server 101 to the system server 109. Once the funds have been received, system server 109 issues a token to client server 101. The token represents a value of postage that the client is allowed to mark envelopes with. The token may be equal to the amount of funds received or may be a lesser amount. For example, $1000 US funds may have been transferred, while the issued token may be for $100 US postage. The e-meter 111 in the system server 109 may maintain a balance of available funds. Token register 112 in the client server 101 may maintain a balance of available postage.

After the token has been received, the client server 101 may begin processing mail by stuffing a letter into an envelope 203. The client server may then calculate the postage for the letter 204 as described above. The client server then checks to see if sufficient value in the token for this letter 205. If not, then the process proceeds to block 212. If so, then client server applies the calculated postage against the token 206. The client server may then generate the RIBI indicium 207 using one of the three embodiments described above. The generated RIBI and the associated IBI information is logged in database 107. Alternatively, the system server may generate the RIBI indicium and then provide the indicium to the client server; or the system server and the client server may form the RIBI indicium together. The printer 104 would then apply the RIBI indicium to the envelope 208. Note that server (s) may generate the indicium and send it to the printer, such that the printer receives printing instructions. Alternatively, the printer may be an intelligent printers such that the printer generates and prints the indicium.

In block 209, the process may optionally report the action of the client server to the system server. The report may include recent data base entries of RIBI data and the associated IBI information. The reported information would allow the system server to form additional IBI information and/or an IBI indicium, if necessary, such that each RIBI indicium may be authenticated with an IBI indicium. The process then checks to see if there are more letters 210. If not, then the process ends at 211. If so, then the process returns to block 203 to get the next letter and repeats. Note that IBI information and/or IBI indicium formation by the system server may occur after or in parallel with RIBI formation by the client server.

If there is not sufficient value in the token at block 205, the process then proceeds to block 212, where the actions of the client server are reported to the system server. The report may include recent data base entries of RIBI data and the associated IBI information. The reported information would allow the system server to form additional IBI information and/or an IBI indicium, if necessary, such that each RIBI indicium may be authenticated with an IBI indicium. Note that IBI information and/or IBI indicium formation by the system server may occur after or in parallel with RIBI formation by the client server. Either the reporting of the actions or a separate message would be sent to the system server to indicate that the client server needs another token. The system server would then determine whether sufficient funds exist to issue another token. If so, then the system server returns to block 202 and issues another token. If not, then the system server would send a message or otherwise indicate need for additional funds to the client server. The client server would then send the funds to the system server, and the process would return to block 201.

The reporting action blocks 209 and 212 are optional. The process may have only one of blocks 209 and 212, both of blocks 209 and 212. Block 209 incrementally reports the use of each indicium to the system server. Block 212 reports the indicia usage on a per token basis. Thus, each indicia that was generated and used against a token is reported when the value of the token value is insufficient for further postage. The reporting block(s) may be used at other locations in the process. Reporting may be a requirement for further tokens to be issued. In other words, no further tokens will be issued to the client server until the client server reports the information on the indicia formed for the previous token. Typical reporting actions may include the transfer of the RIBI/IBI entries 300 in the database 107 to the system server.

The system server may send the reporting information to the USPS. Alternatively, the USPS may download the reporting information from one or both of the databases 107 and 110. Thus, the system server or the USPS may review the RIBI information printed onto a envelope and then using the database entries determine the IBI information for the particular piece of mail.

Note that any of the functions described herein may be implemented in hardware, software, and/or firmware, and/or any combination thereof. When implemented in software, the elements of the present invention are essentially the code segments to perform the necessary tasks. The program or code segments can be stored in a processor readable medium or transmitted by a computer data signal embodied in a carrier wave, or a signal modulated by a carrier, over a transmission medium. The "processor readable medium" may include any medium that can store or transfer information. Examples of the processor readable medium include an electronic circuit, a semiconductor memory device, a ROM, a flash memory, an erasable ROM (EROM), a floppy diskette, a compact disk CD-ROM, an optical disk, a hard disk, a fiber optic medium, a radio frequency (RF) link, etc. The computer data signal may include any signal that can propagate over a transmission medium such as electronic network channels, optical fibers, air, electromagnetic, RF links, etc. The code segments may be downloaded via computer networks such as the Internet, Intranet, etc.

Figure 4:
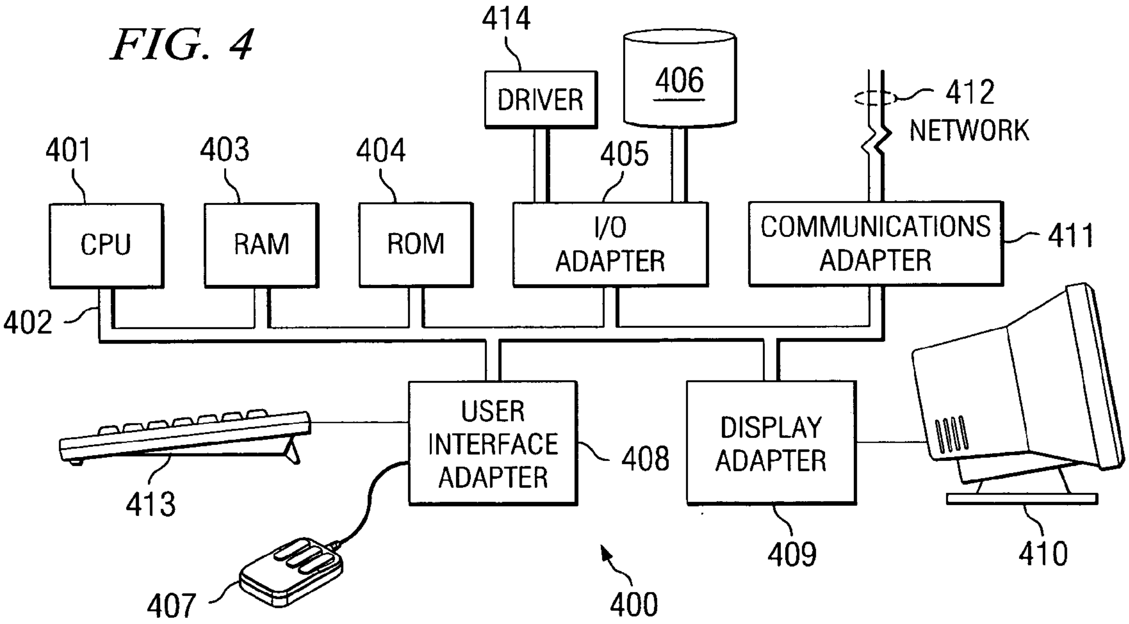
FIG. 4 depicts a block diagram of a computer system which is adapted to use the present invention.

FIG. 4 illustrates computer system 400 adapted to use the present invention. System 400 may be used as either or both of servers 101 and 109. Central processing unit (CPU) 401 is coupled to system bus 402. The CPU 401 may be any general purpose CPU, such as an HP PA-8500 or Intel Pentium processor. However, the present invention is not restricted by the architecture of CPU 401 as long as CPU 401 supports the inventive operations as described herein. Bus 402 is coupled to random access memory (RAM) 403, which may be SRAM, DRAM, or SDRAM. ROM 404 is also coupled to bus 402, which may be PROM, EPROM, or EEPROM. RAM 403 and ROM 404 hold user and system data and programs as is well known in the art.

Bus 402 is also coupled to input/output (I/O) controller card 405, communications adapter card 411, user interface card 408, and display card 409. The I/O adapter card 405 connects to storage devices 406, such as one or more of a hard drive, a CD drive, a floppy disk drive, a tape drive, to the computer system. The I/O adapter card 405 may also connect to a database, such as database 107 and/or database 110. The I/O adapter 405 is also connected to printer 414, which would allow the system to print paper copies of information such as document, photographs, articles, etc. Note that the printer may a printer (e.g. dot matrix, laser, etc.), a fax machine, or a copier machine. The printer 414 may be postage printer 104. Communications card 411 is adapted to couple the computer system 400 to a network 412, which may be one or more of a telephone network, a local (LAN) and/or a wide-area (WAN) network, an Ethernet network, and/or the Internet network. The network 412 may be the network 108. User interface card 408 couples user input devices, such as keyboard 413, and pointing device 407, to the computer system 400. User interface card 408 also provides sound output to a user via speaker (s) 415. The display card 409 is driven by CPU 401 to control the display on display device 410.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A high speed mail processing method comprising:

receiving a token representing a predetermined value from a trusted meter, said token authorizing issuance of a plurality of reduced information based postage indicia up to said predetermined value;

forming, by a computer processor, a dataset comprising enough information to create one or more full information based postage indicia;

forming, by said computer processor, one or more said reduced information based postage indicia using information from said dataset, wherein said reduced information based postage indicia evidences paid postage on a mail piece, and wherein said reduced information based postage indicia comprises less than said enough information to create a full information based postage indicia for said mail piece; and printing, by a printer, said reduced information based postage indicia without printing said full information based indicia and without delay associated with generating said full information based postage indicia, wherein said reduced information postage indicia is printed as evidence of paid postage.

2. The high speed mail processing method of claim 1 further comprising:

forming an association between said reduced information based postage indicia and said information from said dataset used to form said reduced information based postage indicia.

3. The high speed mail processing method of claim 2 further comprising:

communicating a record to a processor-based system comprising said trusted meter wherein said record comprises said dataset and said association.

4. The high speed mail processing method of claim 3 further comprising:

receiving a second token representing a second predetermined value from said trusted meter only after receiving said record.

5. The high speed mail processing method of claim 3 further comprising:

storing said record and wherein said reduced information based postage indicia comprises a pointer to a location of said stored record.

6. The high speed mail processing method of claim 3 further comprising:

creating said full information based postage indicia for said mail piece from said communicated record.

7. The high speed mail processing method of claim 6 wherein said full information based postage indicia is formed after said reduced information based postage indicia is printed.

8. The high speed mail processing method of claim 6 further comprising:

sending said full information based postage indicia to a service provider for use in authenticating said reduced information based postage indicia.

9. The high speed mail processing method of claim 1 wherein said reduced information based postage indicia is formed by a processor-based system lacking a trusted meter.

10. The high speed mail processing method of claim 1 wherein said printing said reduced information based postage indicia occurs with a single pass of the printer.

11. A high speed mail processing system comprising:

a token representing a predetermined value from a trusted meter, said token adapted for authorizing issuance of a plurality of reduced information based postage indicia up to said predetermined value, wherein said reduced information based postage indicia evidences paid postage on a mail piece;

a processor-based system operating under control of an instruction set defining operation for forming one or more of said reduced information based postage indicia using said token, for forming a dataset comprising enough information to create one or more full information based postage indicia corresponding to said one or more reduced information based postage indicia, for defining an association between said one or more reduced information based postage indicia and said corresponding dataset, wherein said one or more reduced information based postage indicia comprises less than said enough information to create one or more full information based postage indicia; and a printer coupled to said processor-based system and operable under control of said processor-based system to print said one or more reduced information based postage indicia for use as evidence of paid postage, wherein said printer prints said one or more reduced information base postage indicia without printing said one or more full information based indicia and without delay associated with generating said full information based postage indicia.

12. The high speed mail processing system of claim 11 further comprising:

a report comprising said dataset and said association, wherein said report is communicated to a processor-based system hosting said trusted meter.

13. The mail processing system of claim 12 further comprising:

a service provider report communicated to a service provider comprising said report, wherein said service provider report authenticates said reduced information based postage indicia.

14. The mail processing system of claim 12 further comprising:

a database adapted to store said report, and wherein said reduced information based postage indicia comprises a pointer to a location of said report.

15. The mail processing system of claim 12 further comprising:

a second token issued from said trusted meter only after said report is communicated.

16. The high speed mail processing system of claim 11 wherein said full information based postage indicia is created after said printer prints said reduced information based postage indicia.

17. The high speed mail processing system of claim 16 wherein said reduced information based postage indicia is authenticatable using said full information based postage indicia.

18. The high speed mail processing system of claim 11 wherein said reduced information based postage indicia is authenticatable using said dataset.

19. The high speed mail processing system of claim 11 wherein said printer prints said reduced information based postage indicia with a single pass of said printer.

20. The high speed mail processing system of claim 11 wherein said processor-based system lacks a trusted meter.

21. A system comprising:

a computer processor operable to form a dataset comprising enough information to create one or more full information based postage indicia;

said computer processor operable to form one or more reduced information based postage indicia using information from said dataset, wherein said reduced information based postage indicia evidences paid postage on a mail piece, and wherein said reduced information based postage indicia comprises less than said enough information to create a full information based postage indicia for said mail piece; and a printer operable to print said reduced information based postage indicia without printing said full information based indicia and without a delay associated with generating said full information based postage indicia wherein said reduced information postage indicia is printed as evidence of paid postage.

* * * * *

UNITED STATES PATENT AND TRADEMARK OFFICE

CERTIFICATE OF CORRECTION

PATENT NO. : 8,285,651 B1
APPLICATION NO. : 11/323462
DATED : October 9, 2012
INVENTOR(S) : J P Leon et al.

It is certified that error appears in the above-identified patent and that said Letters Patent is hereby corrected as shown below:

In the Specification:

Column 2, Line 67, delete the portion of text reading "(RIM)" and replace with --(RIBI)--.

Signed and Sealed this
Twenty-fifth Day of December, 2012

David J. Kappos
*Director of the United States Patent and Trademark Office*